United States Patent [19]

Seino et al.

[11] 4,362,273

[45] Dec. 7, 1982

[54] PRODUCTION OF DYESTUFF POWDERS

[75] Inventors: Junzaburo Seino, Osaka; Hiroshi Ikeda, Nara; Washohati Abo; Iwao Minami, both of Osaka; Joji Fuji, Aomori, all of Japan

[73] Assignee: Sumitomo Chemical Company, Limited, Osaka, Japan

[21] Appl. No.: 204,710

[22] Filed: Nov. 6, 1980

[30] Foreign Application Priority Data

Nov. 28, 1979 [JP] Japan ............................. 54-154751

[51] Int. Cl.$^3$ ............................................. F26B 3/10
[52] U.S. Cl. ........................................ 239/128; 34/31
[58] Field of Search .................. 239/128, 79, 424; 34/30, 31, 46, 47, 57 R, 57 B, 10, 13, 20

[56] References Cited

U.S. PATENT DOCUMENTS 3,786,573  1/1974  Scheppe et al. ..................... 34/31
3,950,183  4/1976  Weber et al. ........................ 34/31

Primary Examiner—James B. Marbert
Attorney, Agent, or Firm—Birch, Stewart, Kolasch and Birch

[57] ABSTRACT

A method for producing dyestuff powders by spray drying a dye dispersion or solution characterized in that the spray drying is effected using a spray dryer comprising a drying room with an inlet for the introduction of hot air into the drying room and an outlet for the discharge of hot air with dyestuff powders from the drying room, an atomizer for spraying the dye dispersion or solution therethrough positioned at the upper part of the drying room and an accelerating means for increasing the velocity of the hot air. The production parameters are controlled so that the temperature at the inlet is between 110° and 260° C., the temperature at the outlet is between 60° and 80° C. and the velocity of hot air at the position just under or around the atomizer is between 5 and 80 m/sec.

11 Claims, 4 Drawing Figures

PRODUCTION OF DYESTUFF POWDERS

The present invention relates to the production of dye-stuff powders. More particularly, it relates to an improvement in a method for producing dyestuff powders by spray drying a dye dispersion or solution.

Production of dyestuff powders by spray drying dye dispersions or solutions is well known (cf. Japanese Published Examined Patent Application Nos. 17299/1968, 17303/1968, 3670/1970, 31156/1971, 1698/1973, etc.). These procedures can afford dry products in a powdery state from dye dispersions or solutions by a single operation and are much more advantageous than other procedures wherein many operations such as filtration, separation, drying and pulverization are needed. In those procedures, spray drying is effected by the use of a spray dryer, of which some typical examples are shown in FIGS. 1 and 2 of the accompanying drawings. In FIGS. 1 and 2 showing respectively the outlines of typical examples of conventional spray dryers, a dye stock liquor 1 is jet-sprayed into a drying room 4 through an atomizer A positioned at the upper part of the drying room while introducing hot air 2 from a duct 2-a into the drying room. The dried product 3 is taken out through a duct 3-a. The atomizer may be of any conventional type and is preferably a centrifugal atomizer in the case of a FIG. 1 apertures wherein the hot air is applied to the jet-sprayed dye stock liquor from the horizontal direction and is preferably a nozzle type atomizer (either a high or low pressure type with one to several nozzles) or a two fluid nozzle type atomizer in the case of FIG. 2 apparatus wherein the hot air is applied to the jet-sprayed dye stock liquor vertically from the higher part.

On spray drying of the dye stock liquor (dispersion or solution) by the use of said conventional spray dryers, there are produced various problems such as adhesion of the dye onto the inner surfaces of the spray dryers due to the insufficiency of drying and lowering of the dyeing properties of the dye due to thermal deterioration and break down of dispersibility. These problems are particularly serious for dispersive dyes and vat dyes, which are quite sensitive to heat.

In order to overcome the said drawbacks in conventional spray drying methods, some proposals have been made. For instance, it has been proposed to keep the temperatures at the inlet and the outlet of the spray dryer as low as possible, which correspond respectively to the temperature of hot air containing no steam to be introduced into the drying room (i.e. the temperature around the duct 2-a in FIGS. 1 and 2) and the temperature of hot air containing steam discharged from the drying room (i.e. the temperature around the duct 3-a in FIGS. 1 and 2). However, lowering of the inlet temperature results in reduction of equipment capacity and thermal efficiency, and lowering of the outlet temperature results in insufficiency of drying whereby adhesion of the dye onto the inner surface of the spray dryer and an increase of the water content in the dye with deterioration of the quality are caused. Particularly, the dye adhered onto the inner surface of the spray dryer is exposed to hot air for a long period of time so that a deterioration of the quality, a loss of the product, a increase in the quantity of water for washing the spray dryer, etc. are produced. Because of these reasons, the dye-drying temperature as determined taking into account dye qualities and economy is generally from 110° to 180° C. at the inlet and from 80° to 120° C. at the outlet with a velocity of hot air of at the most up to 4 m/sec. In the production of, however, dyes sensitive to heat or dyes of higher concentrations, said conventional spray drying methods, even under severe control of operation conditions, still cause problems in dispersibility in or miscibility with water, dyeing properties such as dyeing power, shade and unlevellness (e.g. speck, tarring), water content and appearance.

As the result of an extensive study, it has now been found that the said defects as observed in conventional spray drying methods can be overcome by effecting the spray drying with the control of the outlet temperature below 80° C. and of the velocity of hot air at the position just under or around the atomizer above 5 m/sec. The control to such conditions is of an unexpected nature, because the spray drying of the dye stock liquor under these conditions has rather been expected to produce insufficient drying and various problems, as mentioned above, and thus have never been adopted.

According to the present invention, there is provided a method for producing dyestuff powders by spray drying a dye dispersion or solution characterized in that the spray drying is effected using a spray dryer comprising a drying room with an inlet for introduction of hot air into the drying room and an outlet for discharge of hot air with dyestuff powders from the drying room and an atomizer for spraying the dye dispersion or solution therethrough positioned at the upper part of the drying room and an accelerating means for increasing the velocity of hot air, under the control for keeping the temperature at the inlet between 110° and 260° C., the temperature at the outlet between 60° and 80° C. and the velocisity of hot air at the position just under or around the atomizer between 5 and 80 m/sec.

The spray drying method of this invention will be hereinafter illustrated with reference to FIGS. 3 and 4 of the accompanying drawings.

In FIG. 3 showing the outline of an example of the spray dryer which is suitable for the application of the spray drying method of the invention and FIG. 4 showing the enlarged view of the atomizer in the spray dryer as given in FIG. 3, hot air 2 is introduced into a drying room 4 through a duct 2-a. For increasing the velocity of hot air, any accelerating means may be provided on the duct 2-a. In FIGS. 3 and 4, the accelerating means is a venturi tube 2-b. In place of a venturi tube, any other tube having a contracted caliber may be used.

A dye stock liquor 1 is sprayed into the drying room in a parallel current or counter-current to the hot air from a nozzle type atomizer A positioned at the center of the upper part of the drying room. The sprayed dye stock liquor is further atomized by the hot air into extremely fine droplets, and the water present in the droplets is vaporized instantly.

In carrying out the method of the invention, it is desirable to send the hot air in a laminar flow like the usual spray drying. It is also desirable to set a fan and one to several cyclone separators at the back of the drying room.

The velocity of hot air is from 5 to 80 m/sec, preferably from 6 to 30 m/sec, more preferably from 10 to 20 m/sec. The spraying pressure may be selected from a wide range of 5 to 200 kg/cm$^2$. It is notable that in the present invention, spray drying can easily be achieved even at a low pressure from 5 to 20 kg/cm$^2$, which is not applicable to the conventional spray drying. This is advantageous in that the maintenance of sprayers and pumps is easier than in the high-pressure spray drying. By setting a cold air feed inlet at the head of the drying room (5 in FIGS. 3 and 4), drying can be carried out more efficiently, and besides thermal deterioration of dyes can further be inhibited.

The inlet temperature is from 110° to 260° C., preferably from 140° to 240° C., and the outlet temperature is from 60° to 80° C., preferably from 60° to 70° C. The inlet temperature referred to herein is, in FIG. 3, a temperature around the duct 2-a, and the outlet temperature is a temperature around the duct 3-a.

By the use of the drying conditions of the invention a reduction in the adhesion of dye to the inner surface of the spray dryer, an increase in drying capacity, an enhancement in the thermal efficiency by the increase of temperature difference between the inlet and the outlet, a savings in water for washing equipment and a savings in labor can be achieved. Further, the lowering of dye qualities caused by thermal deterioration can be prevented. Furthermore, the dispersibility in or miscibility with water and dyeing properties of the dyestuff powders obtained by this invention are outstandingly superior to those of dyestuff powders obtained by the conventional drying methods, and high-concentration and good-quality dye products that can not be obtained by the conventional methods, are obtainable.

Dyes, to which the method of this invention is applicable, include disperse dyes, vat dyes, reactive dyes, fluorescent brightening agents, cationic dyes, etc. Among these, disperse dyes, vat dyes and reactive dyes are particularly preferred.

The present invention will be illustrated in more detail with reference to the following examples, wherein parts and % are by weight.

Example 1

Preparation of dye dispersion:

To 42 parts of the conc. cake of "Sumikaron Yellow Brown S-2RL" (a disperse dye produced by Sumitomo Chemical Co., Ltd.), 36 parts of a condensate between naphthalenesulfonic acid and formaldehyde (dispersing agent (1)), 13 parts of a condensate between a Schäffer's acid/cresol mixture and formaldehyde (dispersing agent (2)) and 9 parts of a lignin dispersing agent (dispersing agent (3)) were added, and the resulting mixture was dispersed in an aqueous medium by a sand mill to obtain a dye dispersion (I) (solid content, 25%)

Figure 3:
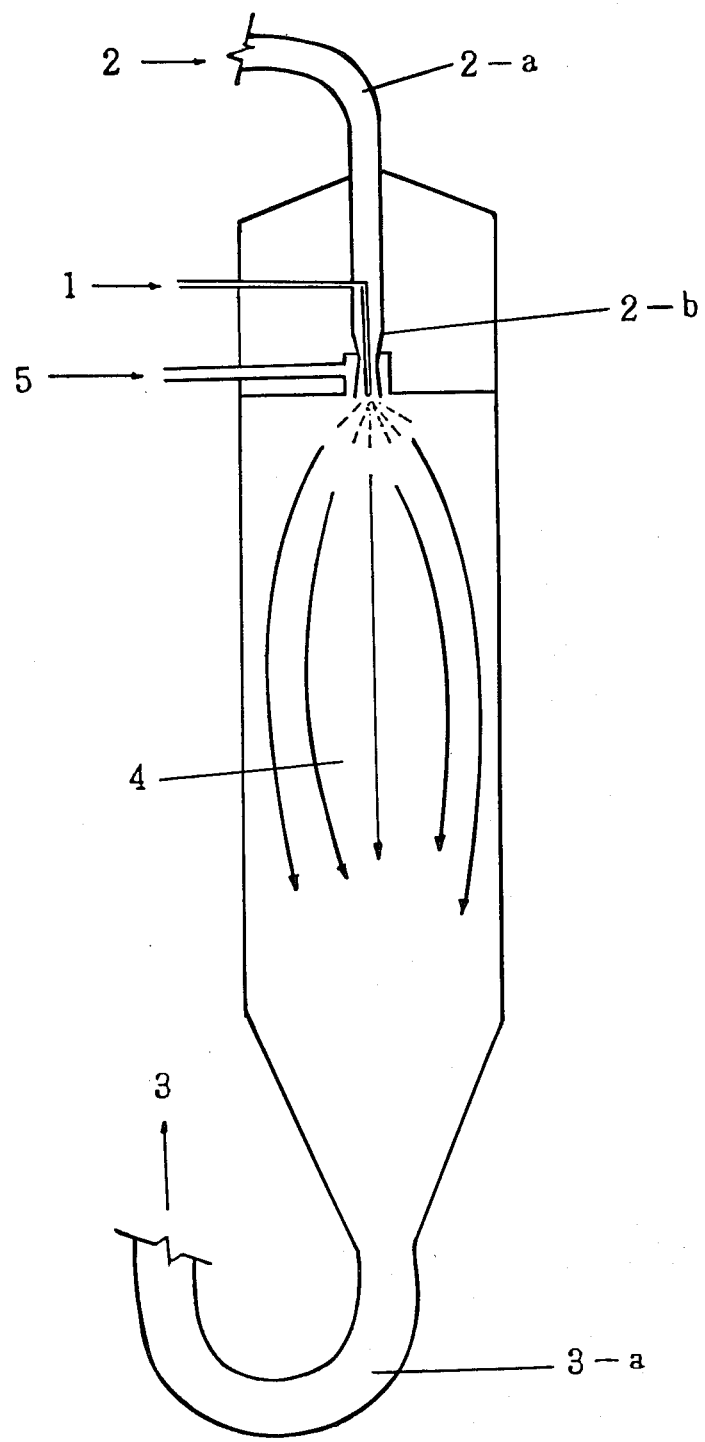
FIG. 3 is an outline drawing of the spray dryer of the invention.
Figure 4:
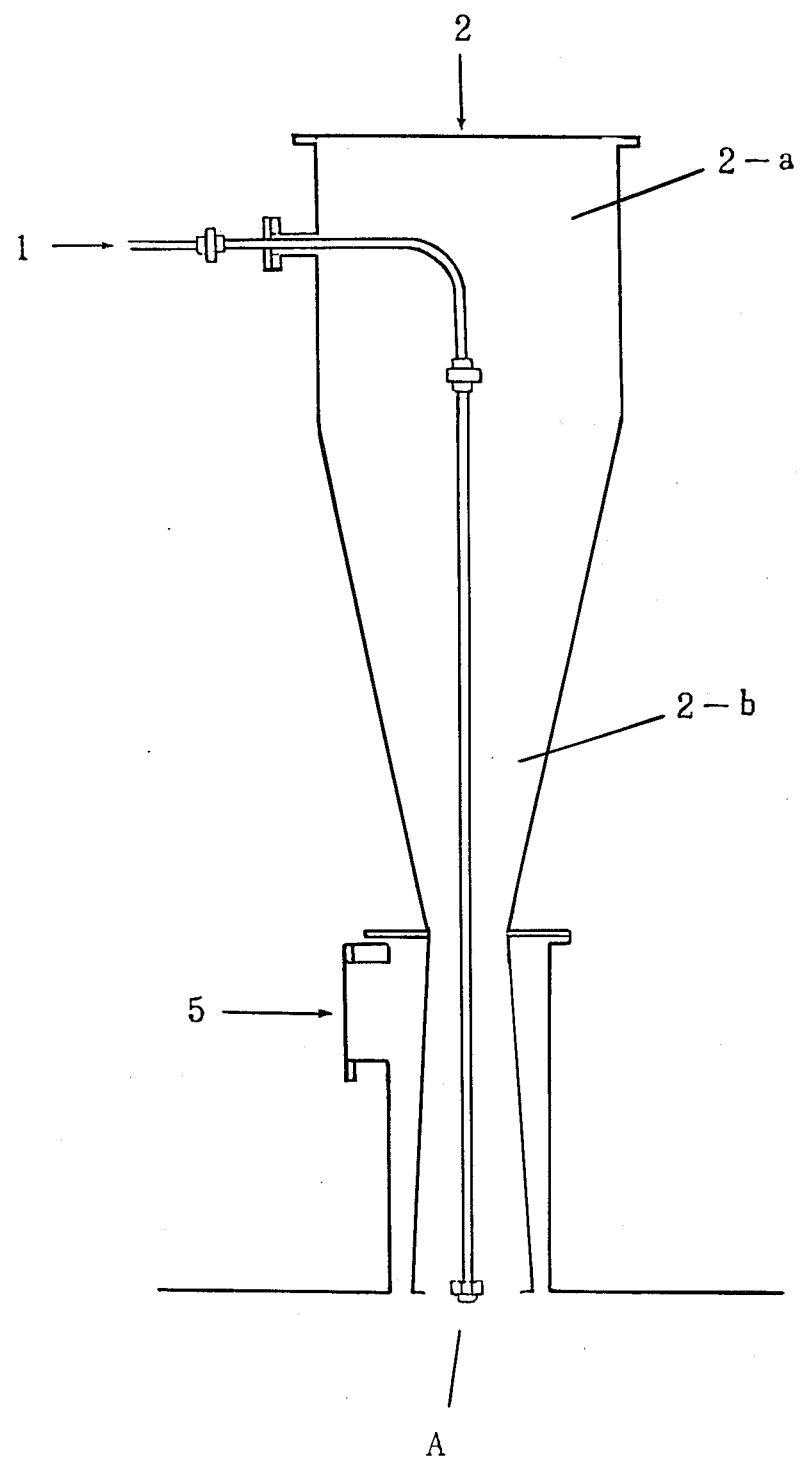
FIG. 4 is an enlarged view of the atomizer shown in FIG. 3.

Spray drying:

The dye dispersion (I) was spray dried under the following conditions using a spray dryer as shown in FIG. 3:

| Spraying pressure | 180 kg/cm$^2$ |
| Inlet temperature | 140° C. |
| Outlet temperature | 68° C. |
| Velocity of hot air just below spraying (hereinafter referred to as "velocity of hot air") | 6 m/sec |

The dyestuff powder (I) thus obtained had a water content of 6%. Adhesion of the dye to the inner surface of the dryer was not substantially observed. Consequently, washing of the dryer after use was easy, and the amount of water necessary for washing could be saved to a large extent. The temperature difference ($\Delta t$) between the inlet and the outlet was 72° C., giving a great improvement in thermal efficiency and drying capacity as compared with the conventional drying method.

Qualities of dyestuff powder:

On dyeing polyester fibers, the dyestuff powder (I) showed a color yield of 140%, which is 1.4 times higher than that (100%) of a commercial product of "Sumikaron Yellow Brown S-2RL". Dye aggregation due to thermal deterioration was not substantially observed. When a polyester/cotton (65/35) blended cloth was dyed by thermosol in a dye dispersion of 1.42 g/L, good-quality dyeings having no speck (fine unlevelness produced on cloth) were obtained.

Comparative Example 1

Figure 2:
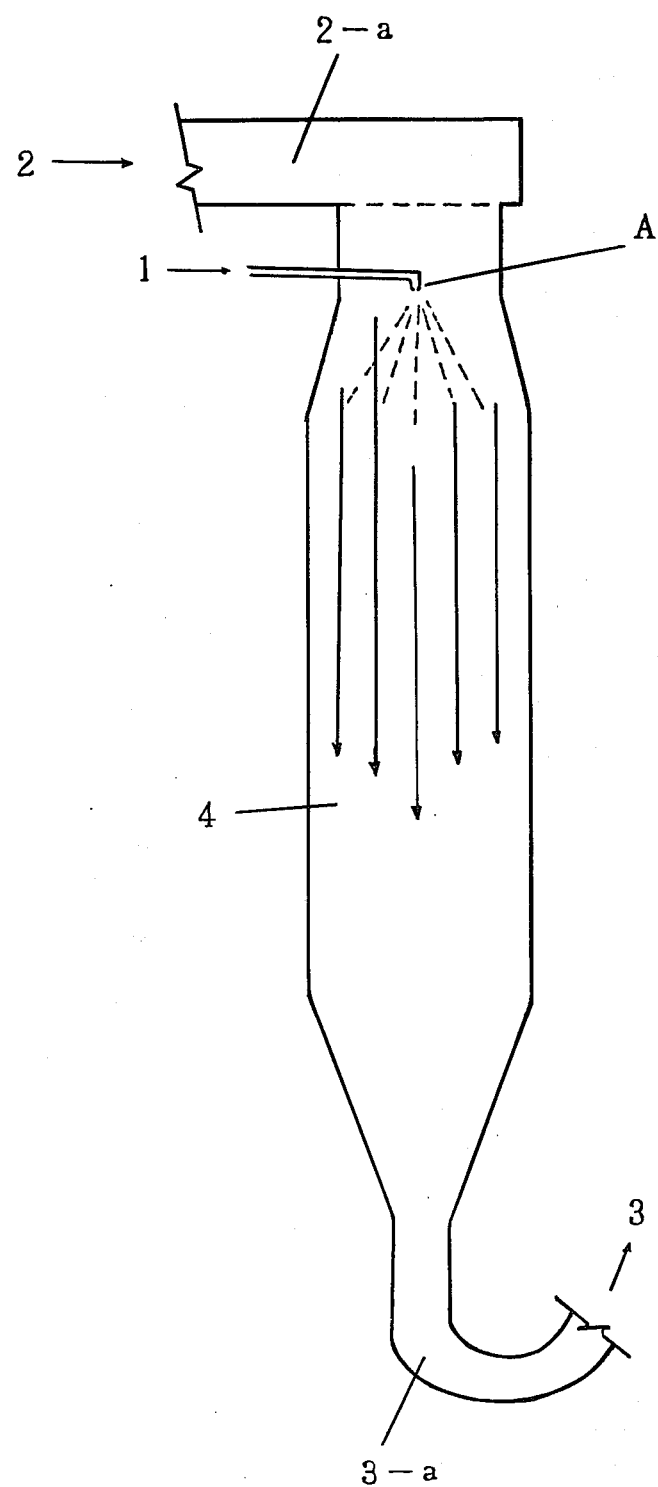

The same dye dispersion (I) as used in Example 1 was spray dried under the following conditions using a spray dryer as shown in FIG. 2:

| Spraying pressure | 180 kg/cm$^2$ |
| Inlet temperature | 140° C. |
| Outlet temperature | 85° C. |
| Velocity of hot air | 2.5 m/sec |

The dyestuff powder thus obtained contained dye aggregates due to thermal deterioration in an extremely large amount. On thermosol dyeing of a polyester/cotton (65/35) blended cloth in a dye dispersion of 1.42 g/L, specks were markedly caused, giving only low-quality dyeings not applicable to practical use.

Separately, spray drying was carried out at an outlet temperature of 68° C. like Example 1, but drying was insufficient, and the dye adhered to the inner surface of the dryer in a large amount. Thus, practical application was hardly possible.

Comparative Example 2

For obtaining a dyestuff powder of the quality as like the dyestuff powder (I) in Example 1 as possible, a dye dispersion was prepared with a decreased amount of dye, as described below, and then spray dried.

A dye dispersion was prepared according to Example 1 using 30 parts of the dye conc. cake, 48 parts of the dispersing agent (1), 13 parts of the dispersing agent (2) and 9 parts of the dispersing agent (3). Thereafter, the dye dispersion was spray dried under the following conditions using a spray dryer as shown in FIG. 2:

| Spraying pressure | 180 kg/cm$^2$ |
| Inlet temperature | 110° C. |
| Outlet temperature | 85° C. |
| Velocity of hot air | 2.5 m/sec |

The dyestuff powder thus obtained had a water content of 6%. Adhesion of the dye to the inner surface of the dryer was fairly observed. Consequently, a considerably long period of time was required for washing after drying, and the quantity of water required for washing amounted to more than three times as much as that in Example 1. The temperature difference between the inlet and the outlet was 25° C.; thermal efficiency, drying capacity and equipment productivity were thus fairly inferior to those in Example 1. On dyeing polyester fibers, the dyestuff powder gave a color yield of 40% lower than that of the dyestuff powder (I) in Example 1, but other qualities were the same. When a polyester/cotton (65/35) blended cloth was dyed by thermosol, dyeings having a few specks were obtained.

Example 2

Preparation of dye dispersion:-

To 38 parts of the conc. cake of "Sumikaron Red S-GG", 23 parts of the dispersing agent (1), 34 parts of the dispersing agent (2) and 5 parts of the dispersing agent (3) were added, all the agents being the same as used in Example 1, and the mixture was dispersed in an aqueous medium by a sand mill to obtain a dye dispersion (II) having a solid content of 22%.

Spray drying:-

The dye dispersion (II) was spray dried under the following conditions using a spray dryer as shown in FIG. 3:

| Spraying pressure | 190 kg/cm$^2$ |
| Inlet temperature | 150° C. |
| Outlet temperature | 70° C. |
| Velocity of hot air | 6.5 m/sec |

The dyestuff powder (II) thus obtained had a water content of 5%. Adhesion of the dye to the inner surface of the dryer was not substantially observed, and washing after drying was easy. The temperature difference between the inlet and the outlet was 80° C., giving improved thermal efficiency and drying capacity.

Qualities of dyestuff powder:-

On dyeing polyester fibers, the dyestuff powder (II) showed a color yield of 140%, which is 1.4 times higher than that (100%) of a commercial product of "Sumikaron Red S-GG". Dye aggregation due to thermal deterioration was not substantially observed. When a polyester/cotton (65/35) blended cloth was dyed by thermosol in a dye dispersion of 1.42 g/L, good-quality dyeings having no speck were obtained.

A polyester jersey (produced by Teijin Limited) was rolled up and closed at both ends with rubber bands against easy penetration of dye bath. This material was high-temperature dyed at 115° C. for 20 minutes in a dye bath having a dyeing concentration of 2.8% based on the material. As the result, good-quality dyeings having little tarring (unlevellness due to dye aggregation in high-temperature dyeing) were obtained.

Comparative Example 3

The same dye dispersion (II) as used in Example 2 was spray dried under the following conditions using a spray dryer as shown in FIG. 2:

| Spraying pressure | 190 kg/cm$^2$ |
| Inlet temperature | 150° C. |
| Outlet temperature | 85° C. |
| Velocity of hot air | 2.5 m/sec |

The dyestuff powder thus obtained contained dye aggregates due to thermal deterioration in a large amount and produced many specks on a polyester/cotton (65/35) blended cloth when dyed by thermosol. On high-temperature dyeing at 115° C. for 20 minutes, the dyeings obtained were of such a quality that the number of tarring generated was too large for practical use.

Comparative Example 4

For obtaining a dyestuff powder of the quality as like the dyestuff powder (II) in Example 2 as possible, a dye dispersion was prepared with a decreased amount of dye, as described below, and then spray dried.

A dye dispersion was prepared according to Example 2 using 30 parts of the dye conc. cake, 28 parts of the dispersing agent (1), 37 parts of the dispersing agent (2) and 5 parts of the dispersing agent (3).

The dye dispersion was then spray dried under the following conditions using a spray dryer as shown in FIG. 2:

| Spraying pressure | 180 kg/cm$^2$ |
| Inlet temperature | 130° C. |
| Outlet temperature | 85° C. |
| Velocity of hot air | 2.5 m/sec |

The dyestuff powder thus obtained had a water content of 5%. Adhesion of the dye to the inner surface of the dryer was fairly observed. Consequently, a considerably long period of time was required for washing after drying, and the quantity of water required for washing was more than three times as much as that in Example 2.

The temperature difference between the inlet and the outlet was 45° C.; thermal efficiency, drying capacity and equipment productivity were thus fairly inferior to those in Example 2.

On dyeing polyester fibers with the dry dye thus obtained, the color yield was 22% lower than that obtained in Example 2, but no speck was produced. In high-temperature dyeing, however, tarring was caused so that satisfactory dyeings were not obtained.

Example 3

Preparation of dye distortion:

To 60 parts of the conc. cake of "Nihonthrene Olive T dispersed powder" (a vat dye produced by Sumitomo Chemical Co., Ltd.), there were added 3 parts of the dispersing agent (1) and 37 parts of the dispersing agent (2), both agents being the same as used in Example 1. The resulting mixture was dispersed in an aqueous medium by a sand mill to obtain a dye dispersion (III) having a solid content of 23%.

Spray drying:

The dye dispersion (III) was spray dried under the following conditions using a spray dryer as shown in FIG. 3 to obtain a dyestuff powder (III):

| Spray pressure | 180 kg/cm$^2$ |
| Inlet temperature | 160° C. |
| Outlet temperature | 70° C. |
| Velocity of hot air | 6 m/sec |

Qualities of dyestuff powder:

The dyestuff powder (III) showed a color yield of 1.43 times higher than that of a commercial product of "Nihonthrene Olive T dispersed powder". Dye aggregation due to thermal deterioration was not substantially observed. Using this dyestuff powder (III), a dye dispersion of 1.4 g/L was prepared. 40-Count cotton poplin was padded with this dispersion, dried, padded with a reducing liquor comprising sodium hydroxide and hydrosulfite, and then steamed. Good-quality dyeings having no speck were thus obtained.

Comparative Example 5

Figure 1:
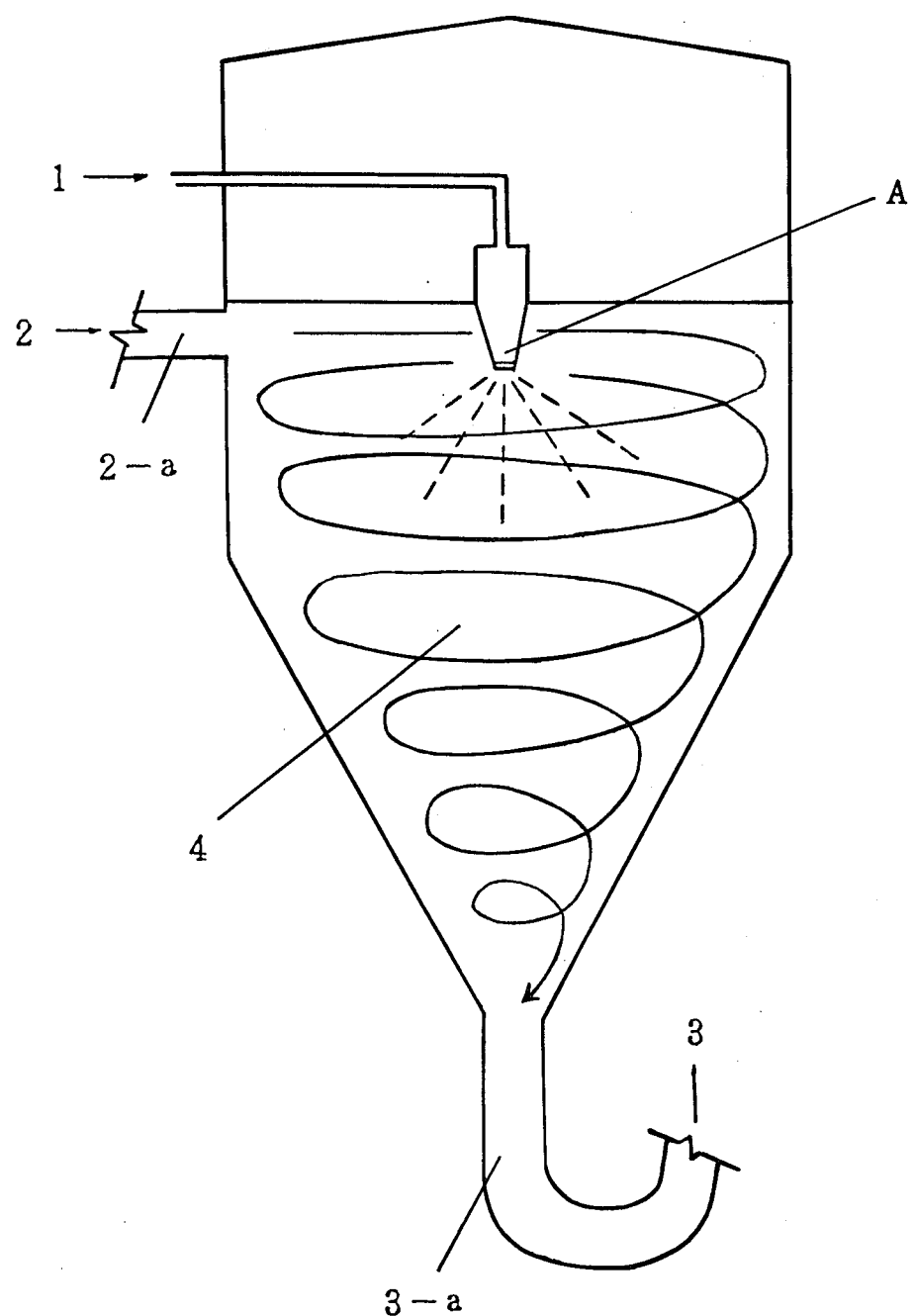
FIGS. 1 and 2 show outline drawings of conventional spray dryers.

The dye dispersion (III) obtained in Example 3 was dried using a spray dryer as shown in FIG. 1. The dye dispersion was sent by a pump to an atomizer (8500 r.p.m.) and centrifugally sprayed therethrough. At that time, the inlet temperature was 160° C., and the outlet one was 82° C. The dye-stuff powder thus obtained produced many specks on dyeing and was not suitable for practical use.

Example 4

Preparation of dye dispersion:

To 27 parts of the conc. cake of "Sumikaron Orange SE-B conc.", there were added 43 parts of the dispersing agent (1), 10 parts of the dispersing agent (2) and 20 parts of the dispersing agent (3), all the agents being the same as used in Example 1. The resulting mixture was dispersed in an aqueous medium by a sand mill to obtain a dye dispersion (IV) having a solid content of 26%.

Spray drying:

The dye dispersion (IV) was spray dried under the following conditions using a spray dryer as shown in FIG. 3:

| | |
|---|---|
| Spraying pressure | 10 kg/cm$^2$ |
| Inlet temperature | 160° C. |
| Outlet temperature | 70° C. |
| Velocity of hot air | 10 m/sec |

The dyestuff powder (IV) thus obtained had a water content of 6%. Adhesion of the dye to the inner surface of the dryer was not substantially observed.

Qualities of dyestuff powder:

The dyestuff powder (IV) showed a color yield of 1.2 times that of a commercial product of "Sumikaron Orange SE-B conc.". On thermosol dyeing of a polyester/cotton (65/35) blended cloth with this dye, no specks were observed. Tarring was little observed in high-temperature dyeing (115° C., 20 minutes) of polyester jersey (produced by Teijin Limited). In either case, good-quality dyeings were obtained.

Comparative Example 6

The dye dispersion (IV) in Example 4 was spray dried under the following conditions using a spray dryer as shown in FIG. 2.

| | |
|---|---|
| Spraying pressure | 10 kg/cm$^2$ |
| Inlet temperature | 140° C. |
| Outlet temperature | 85° C. |
| Velocity of hot air | 2.5 m/sec |

Drying was however insufficient; that is, the sprayed dye dispersion dropped down, as liquid droplets, to the bottom of the dryer and adhered thereto. Thus, normal drying could not be carried out. The dispersion adhered to the inner surface of the dryer to form dye lumps which were very poor in quality.

Example 5

Preparation of dye dispersion:

To 60 parts of the conc. cake of "Sumikaron Yellow Brown S-2RL", there were added 26 parts of a partially desulfonated sodium lignosulfonate type dispersing agent (dispersing agent (4)), 10 parts of the dispersing agent (2) and 4 parts of a condensate between a 2-naphthol-6,8-disulfonic acid/cresol mixture and formaldehyde. The mixture was dispersed in an aqueous medium by a sand mill to obtain a dye dispersion (V) having a solid content of 25%.

Spray drying:

The dye dispersion (V) was spray dried under the following conditions using a spray dryer as shown in FIG. 3:

| | |
|---|---|
| Spraying pressure | 180 kg/cm$^2$ |
| Inlet temperature | 125° C. |
| Outlet temperature | 65° C. |
| Velocity of hot air | 15 m/sec |

Qualities of dyestuff powder:

The dyestuff powder (V) showed a color yield of twice as high as that of a commercial product of "Sumikaron Yellow Brown S-2RL" and the same degrees of miscibility with water, speck and tarring as the commercial product. On thermosol dyeing of a polyester/cotton (65/35) blend cloth with a liquor of the dyestuff powder (V) of 35 g/L, the dyeing efficiency increased by 15% as compared with the case using the commercial product in an amount of two times.

Example 6

An aqueous dye solution (VI) (solid content, 15%; pH, 5) obtained after synthetic reaction of "Sumifix Brilliant Blue R" (a reactive dye produced by Sumitomo Chemical Co., Ltd.) was spray dried under the following conditions using a spray dryer as shown in FIG. 3:

| | |
|---|---|
| Spraying pressure | 180 kg/cm$^2$ |
| Inlet temperature | 230° C. |
| Outlet temperature | 70° C. |
| Velocity of hot air | 20 m/sec |

The dyestuff powder (VI) thus obtained had a water content of 6%. Adhesion of the dye to the inner surface of the dryer was much decreased with a good drying yield. The temperature difference between the inlet and the outlet was 160° C., giving outstandingly improved thermal efficiency and drying capacity as compared with the conventional methods. The dyestuff powder showed no hydrolysis by heat and was rapidly dissolved in water. Its quality was so good as to be comparable to the commercial product.

Example 7

Preparation of dye dispersion:

To 15 parts of the conc. cake of "Sumikaron Yellow Brown S-2RL", there were added 30 parts of the conc. cake of "Nihonthrene Brown R", 7 parts of the dispersing agent (1), 4 parts of the dispersing agent (2) and 44 parts of the dispersing agent (3), all the agents being the same as used in Example 1. The mixture was dispersed in an aqueous medium by a sand mill to obtain a dye dispersion (VII) having a solid content of 25%.

Spray drying:

The dye dispersion (VII) was spray dried under the same conditions as in Example 4 to obtain the dyestuff powder (VII) having a water content of 6%.

Qualities of dyestuff powder:

The dyestuff powder (VII) had an average particle size of 0.5 micron. The crystalline forms of the disperse dye component and of the vat dye component were similar to each other, and the miscibility and dispersibility of those components were excellent. Compared with a commercial product, the dyestuff powder (VII) contained a much smaller amount of crude particles of 20 to 30 microns in particle size, which may cause trouble of specks on dyeing products.

When a polyester/cotton (65/35) blend cloth was dyed using the dyestuff powder (VII) according to a conventional padding, thermosol or steam dyeing method, a fast brown color dyeing was produced without any tailing or listing, but with excellent build-up property.

What is claimed is:

1. A method for producing dyestuff powders by spray drying a dye dispersion or solution comprising spray drying in a spray dryer which includes a drying room with an inlet for introducing hot air into the drying room and an outlet for discharging hot air with dyestuff powders from the drying room, an atomizer for spraying the dye dispersion or solution therethrough positioned at the upper part of the drying room and an acceleration means for increasing the velocity of hot air; said method further comprising maintaining the temperature at the inlet at between 110° and 260° C., the temperature at the outlet at between 60° C. and 80° C. and the velocity of the hot air at the position just under or around the atomizer at between 5 and 80 m/sec.

2. The method according to claim 1, wherein the temperature at the inlet is kept between 140° and 240° C.

3. The method according to claim 1, wherein the temperature at the outlet is kept between 60° and 75° C.

4. The method according to claim 1, wherein the velocity of hot air is kept between 5 and 20 m/sec.

5. The method according to claim 1, wherein the dyes are disperse dye, vat dye and/or reactive dye.

6. The method according to claim 1, wherein said spray dryer further includes a cold air feed inlet positioned at the upper part of said drying room.

7. The method according to claim 1, wherein said accelerating means comprises a venturi tube.

8. A spray dryer apparatus for producing dyestuff powders by spray drying a dye dispersion or solution comprising:
 (a) a drying room having an inlet means for introducing hot air into said drying room and an outlet means for discharging hot air with dyestuff powders from said drying room;
 (b) an atomizer means for spraying a dye dispersion or solution therethrough, said atomizer means being positioned at the upper end of said drying room; and
 (c) an accelerating means operatively positioned near said inlet means for increasing the velocity of said hot air being introduced into said drying room.

9. A spray dryer apparatus as in claim 8, further comprising a cold air feed inlet means positioned at the upper part of said drying room.

10. A spray dryer apparatus as in claim 8 wherein said accelerating means comprises a venturi tube.

11. A spray dryer apparatus as in claim 8, wherein said accelerating means comprises a venturi tube, said drying room further includes a cold air feed inlet means positioned at the upper end thereof, such that said atomizer means is positioned within said venturi tube and said venturi tube is positioned within said cold air inlet means.

* * * * *